United States Patent [19]
O'Connor

[11] 3,962,830
[45]*June 15, 1976

[54] MACHINING STRUCTURE

[76] Inventor: Thomas J. O'Connor, 100 Morgan Road, Ann Arbor, Mich. 48106

[ * ] Notice: The portion of the term of this patent subsequent to May 16, 1989, has been disclaimed.

[22] Filed: Dec. 3, 1973

[21] Appl. No.: 420,808

Related U.S. Application Data

[60] Continuation-in-part of Ser. No. 68,711, Sept. 1, 1970, abandoned, which is a division of Ser. No. 545,652, April 27, 1966, Pat. No. 3,663,786.

[52] U.S. Cl. ................................... 51/58; 51/157
[51] Int. Cl.² ........................................ B24B 7/00
[58] Field of Search ................. 51/59, 58, 157, 119; 219/69 V

[56] References Cited
UNITED STATES PATENTS

| | | | |
|---|---|---|---|
| 2,452,211 | 10/1948 | Rosenthal | 51/59 |
| 2,580,716 | 1/1952 | Balamuth | 51/59 |
| 2,766,364 | 10/1956 | Higgins | 219/69 |
| 3,114,029 | 12/1963 | Pascoe | 219/69 |
| 3,135,852 | 6/1964 | Bentley | 219/69 |
| 3,433,919 | 3/1969 | Braudeau | 219/69 |
| 3,465,480 | 9/1969 | Hausermann | 51/157 |
| 3,564,190 | 2/1971 | Kandjan | 219/69 |
| 3,663,786 | 5/1972 | O'Connor | 51/60 X |

FOREIGN PATENTS OR APPLICATIONS

| | | | |
|---|---|---|---|
| 1,379,623 | 10/1964 | France | 51/157 |
| 1,451,464 | 7/1966 | France | 51/157 |

*Primary Examiner*—Harold D. Whitehead
*Attorney, Agent, or Firm*—Whittemore, Hulbert & Belknap

[57] ABSTRACT

A tool for universal movement of a cutting member in a plane perpendicular to a predetermined direction of movement of the cutting member is disclosed. The tool is disclosed in conjunction with an abrasive electrode form having a shape which is the reverse image of an electrode to be produced thereby and which is constructed of abrasive particles held in a plastic matrix whereby an electrode may be abraded from electrode material on movement of the electrode form toward the electrode material in the predetermined direction. The structure for universally moving the electrode form cutting member in a plane perpendicular to the direction of movement of the cutting member includes relatively eccentric, and rotatable members positioned in two slides slidably mounted perpendicularly to each other.

2 Claims, 10 Drawing Figures

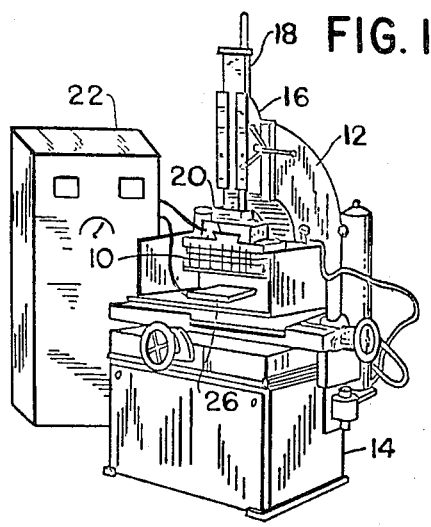
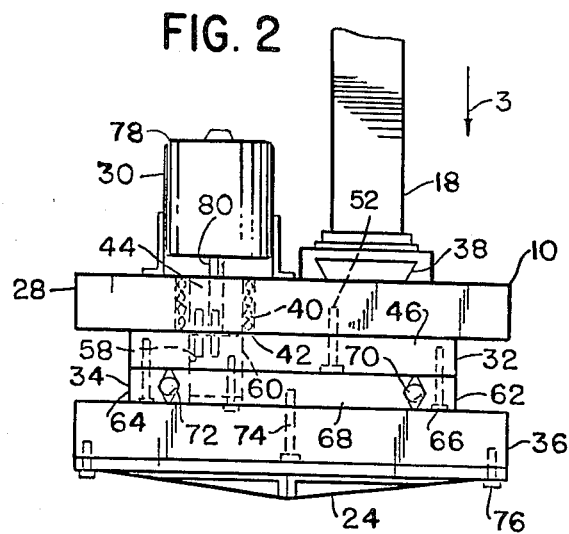
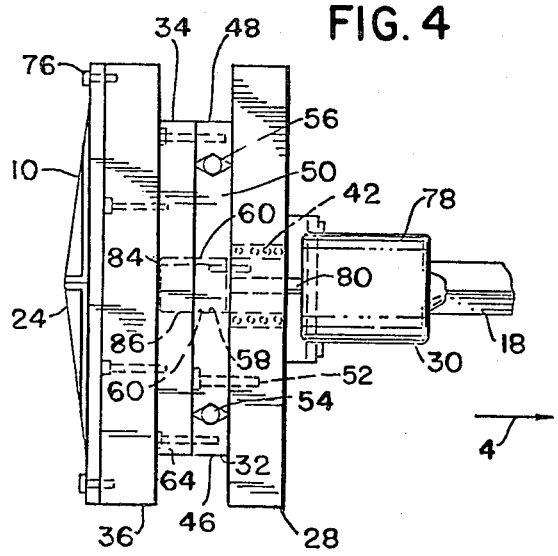
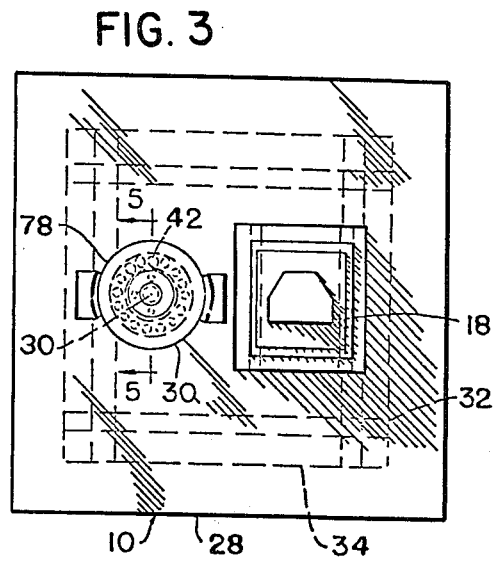
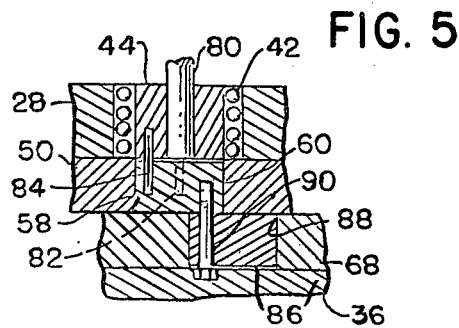

MACHINING STRUCTURE

CROSS-REFERENCE TO RELATED APPLICATIONS

This application is a continuation-in-part of U.S. Pat. application Ser. No. 68,711, filed Sept. 1, 1970, now abandoned, which is a division of U.S. Pat. application Ser. No. 545,652, filed Apr. 27, 1966, now U.S. Pat. No. 3,663,786.

BACKGROUND OF THE INVENTION

1. Field of the Invention

The invention relates to electrical discharge machining and refers more specifically to structure for and a method of producing an electrode or the like.

2. Description of the Prior Art

In the past, electrodes for electrical discharge machining of metals have generally been machined from blocks of electrode material, such as graphite or the like. The machining of each individual electrode separately or even with copy machines, whereby a number of the electrodes may be machined simultaneously, is a tedious proces, wasteful of both man and machine time. In addition, the individual production of electrodes by the usual methods produces slight variations from one electrode to another or in the mounting thereof, so that the electrodes are not exactly interchangeable. Thus, a considerable amount of set up time is required to exactly align an electrode which has been individually machined and mounted with a workpiece when changing of electrodes is required.

In addition, with prior methods and tools for electrical discharge machining, it has often been necessary to machine a rough cavity with one or a series of electrodes after which a finish cut is made by a separate electrode. This is necessary due to wear of the electrode in the usual electrical discharge machine operation. Again changing of the electrode between a rough and finish or between two rough or two finish operations on a workpiece is wasteful of both man and machine time in set-up and changing and handling of the electrodes even if a quick-change system of tooling is used.

SUMMARY OF THE INVENTION

It is therefore one of the objects of the present invention to provide improved structure for producing an electrical discharge machining electrode.

Another object is to provide structure for producing an electrical discharge machining electrode or the like comprising an abrasive mirror image electrode form and means for machining a workpiece with the mirror image electrode form.

Another object is to provide structure as set forth above wherein the means for machining a workpiece with the mirror image electrode form comprises a tool for moving the mirror image electrode form universally in one plane perpendicular to the usual direction of movement of the mirror image electrode form.

Another object is to provide an improved method of producing an electrode for electrical discharge machining or the like comprising producing an abrasive mirror image electrode form and moving the mirror image electrode form toward a workpiece in a manner to abrade the desired electrode from electrode material.

Another object is to provide a method of producing an electrical discharge machining electrode as set forth above wherein the manner of moving the electrode comprises moving the electrode toward the workpiece and at the same time moving the electrode universally in all directions perpendicular to the direction of movement of the electrode toward the workpiece.

Another object is to provide a tool for use with an electrical discharge machine for supporting an electrode on the ram thereof including means for moving the electrode in all directions in a plane perpendicular to the movement of the ram.

Another object is to provide structure as set forth above wherein the tool comprises a pair of slides movable perpendicularly to each other and eccentric means operable between the pair of slides for relatively moving the slides.

Another object is to provide structure as set forth above wherein the eccentric means is adjustable as to eccentricity to determine the relative movement between the slides.

Another object is to provide structure for and a method of producing an electrode for electrical discharge machining or the like which is simple, economical and efficient.

Other objects and features of the invention will become apparent as the description proceeds, especially when taken in conjunction with the accompanying drawings illustrating a preferred embodiment of the invention, wherein:

BRIEF DESCRIPTION OF THE DRAWINGS

FIG. 1 is a perspective view of an electrical discharge machine having a tool for producing electrodes or performing other electrical discharge machining operations in accordance with the invention secured thereto.

FIG. 2 is an enlarged elevational view of the tool illustrated in FIG. 1 including a showing of a portion of the ram of the electrical discharge machine illustrated in FIG. 1.

FIG. 3 is a top view of the tool illustrated in FIG. 2 taken in the direction of arrow 3 in FIG. 2.

FIG. 4 is a side elevation view of the tool illustrated in FIGS. 2 and 3 taken in the direction of arrow 4 in FIG. 3.

FIG. 5 is an enlarged partial section view of the tool illustrated in FIGS. 2–4 taken substantially on the line 5—5 in FIG. 3.

DESCRIPTION OF THE PREFERRED EMBODIMENTS

With particular reference to the Figures of the drawings, one embodiment of the present invention will now be disclosed in detail.

Figure 7:
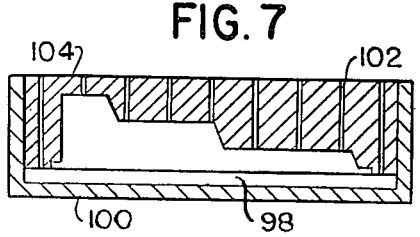
FIG. 7 is a section view of the tray and pattern illustrated in FIG. 6 with the mirror image abrasive electrode form produced thereby.
Figure 8:
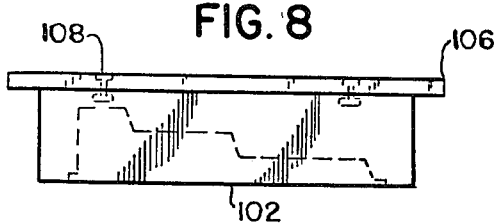
FIG. 8 is a section view of the mirror image abrasive electrode form of FIG. 7 secured to a member for mounting on the electrode forming tool illustrated in FIGS. 2 through 5.
Figure 9:
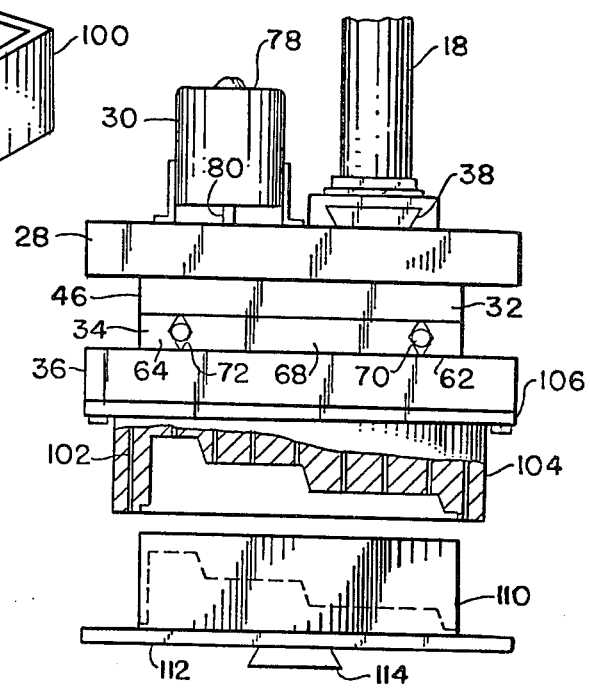
FIG. 9 is a partially broken away elevation view of the electrical discharge machining tool illustrated in FIGS. 2 through 5 having the mirror image abrasive electrode form secured thereto in position over a block of electrode material to be formed thereby into an electrical discharge machining electrode.

In accordance with the invention, the electrical discharge machine tool 10 is useful in conjunction with an electrical discharge machine 12 or similar structure for producing a finished workpiece with a single electrode. The finished workpiece may be in accordance with the invention an electrical discharge machining electrode produced by abrasion with a mirror image abrasive electrode form 14, as illustrated in FIGS. 7 through 9 by the tool 10.

More specifically, the electrical discharge machining apparatus 12 includes a mechanical section 14 having a head mechanism 16 including a ram 18 movable vertically to which the electrical discharge machine tool 10 is secured by means of a quick-change dovetail arrangement 20 as disclosed in U.S. Pat. No. 3,222,494, and an electrical section 22 for providing an electrical signal between the electrode 24 and a workpiece 26 in the usual manner of electrical discharge machining. Servo control apparatus is provided operable between the electrical section 22 and the mechanical section 14 to control movement of the ram 18 in accordance with a gap maintained between the electrode 24 and the workpiece 26 in the usual manner of electrical discharge machines.

Electrical discharge machining apparatus 12 are well known and, for example, are commercially available from Easco-Sparcatron, Inc., of 110 Morgan Road, Ann Arbor, Michigan. They will not be considered in themselves further herein.

The electrical discharge machining tool 10 is shown best in FIGS. 2 through 5 in conjunction with a simple electrical discharge machining electrode 24. The tool 10 includes the base 28, drive means 30, slide structure 32 and slide structure 34. Tool 10 is completed by the electrode mounting member 36 to which the electrode 24 is secured.

Base 28 is a generally rectangular metal member having a dovetail portion 38 for quick, accurate securing of the tool 10 to the ram 18. An opening 40 is provided through the base 28 to receive the bearings 42 and cylinder 44 of the motor means 30.

Slide structure 32 includes the guides 46 and 48 at the opposite sides thereof and the slide 50 positioned between the guides 46 and 48. The slide 50 is rigidly secured to the base 28 by convenient means, such as bolts 52. The guides 46 and 48 are movable relative to the slide 50 on bearing means 54 and 56. An opening 58 is provided through the slide 50 to receive the cam cylinder 60 of the drive means 30.

The slide structure 34 includes the guides 62 and 64 rigidly secured to the guides 46 and 48 by means of bolts 66 or the like. The slide 68 is movable between the guides 62 and 64 on the bearing means 70 and 72 at right angles to the slide 50. Opening 88 is provided in slide 68 to receive the cam cylinder 86 of the drive means 30.

The electrode supporting member 36 is as shown generally rectangular and is secured to the slide 68 by means of bolts 74 or the like. Electrode 24 in the shape of, for example, a recess which it is desired to machine electrically in a workpiece 26 is secured to the member 36 by convenient means, such as bolts 76.

Drive means 30 includes the electric motor 78 which may be energized, such as by a servo mechanism similar to that used to drive the head 18 toward the workpiece in the usual electrical discharge machining apparatus to produce rotation of the output shaft 80 thereof. The drive means 30 further includes the cylinder 44 secured to the shaft 80 for rotation therewith which cylinder is concentric with the shaft 80 and is mounted for rotation in the base 28 by the bearings 42. Cylinder 60 is secured to the shaft 80 and cylinder 44 by means of the pins 82 and 84, as illustrated best in FIG. 5. The drive means is completed by the cylinder 86 secured in the opening 88 through the slide 68 and eccentrically secured to the cylinder 60 by the bolt 90. The eccentricity of the cylinder 86 with respect to the cylinder 60 may be adjusted by means of loosening the bolt 90 and rotating the cylinder 86 about the bolt 90 and retightening bolt 90.

Thus, in overall operation of the electrical discharge machining tool 10 the usual electrical discharge machine servo mechanism is used to drive the ram 18 toward a workpiece whereby the workpiece is formed by the electrode 24 which in the case of a male electrode is formed slightly undersized. The drive means 30 is then caused to rotate whereby the slides 50 and 68 cooperating with guides 46, 48, 62 and 64 provide universal movement of the electrode 24 in a plane perpendicular to the direction of movement of the ram 18 to finish a workpiece exactly. The finishing cut or movement lateral to the ram 18 desired may be adjusted by means of bolt 90 to provide any finishing cut desired. It will be readily understood that a considerably more sophisticated means for adjustment of the eccentricity between cylinders 60 and 86 may be provided as desired.

Thus, it will be seen that a very accurately dimensioned workpiece may be produced by electrical discharge machining without the necessity of changing electrodes for a finishing cut through the use of the electrical discharge machine tool 10 provided in accordance with the invention.

The electrical discharge machining tool 10 in addition has particular application in the production of electrical discharge machining electrodes from carbon or graphite blocks or the like, as shown in FIGS. 6 through 10, by the method of the invention.

Figure 6:
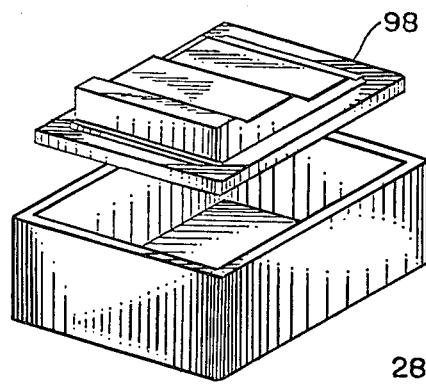
FIG. 6 is a perspective view of a tray and a pattern used for forming a mirror image abrasive electrode form used in producing an electrical discharge machining electrode in accordance with the method of the invention.

As shown in FIG. 6, to produce a plurality of exactly interchangeable carbon electrodes for electrical discharge machining a master pattern 98 for the electrodes is first machined in the usual manner. The master pattern 98 is then placed in a molding tray 100 in an inverted position, as shown in FIG. 6. A mixture of abrasive material, such as carborundum, emery or the like, and a plastic binder, such as an epoxy having minimum shrinkage properties, are then poured over the master pattern 98 which is slightly oversized in the case of a male master pattern. Members, such as small rods, are positioned in the matrix of abrasive material and plastic binder to provide flush openings 102 is desired in the oversize female electrode form mirror image 104 produced on setting of the plastic binder, as illustrated in FIG. 7.

Flushing through the openings 102 may be accomplished with a solvent which may be under pressure. The flushing serves to prevent buildup of abraded particles on the abrasive surface which would reduce the cutting efficiency of the abrasive electrode form 104. Light hydrocarbon solvents such as alcohol and kerosene may be used when the workpiece is carbon. Other flushing materials may be used depending on the material of the form 104 and workpiece.

After the plastic binder has cured, the female electrode form mirror image 104 of the male master pattern 98 is removed from the pan 100 and the pattern 98 and secured to the generally rectangular member 106 by means of the bolts 108 in the manner disclosed in applicant's Patent No. 3,497,930.

As shown best in FIG. 9, the member 106 is then secured to the electrode holding mounting member 36 of the electrical discharge machining tool 10 and the tool 10 is advanced toward the carbon block 110 while the drive means 30 is actuated to abrade the surface of the carbon block 110. If desired, the carbon block may be flushed through the flush holes 102 during abrading or vacuum apparatus or air pressure may be used to remove the abraded material from between the abrasive electrode form 104 and workpiece 110. Since the female abrasive electrode form 104 and the master pattern 98 are slightly oversize, an electrode will be formed in the carbon block 110 of the exact desired size depending on the eccentricity of the cylinders 60 and 86 of the tool 10.

Figure 10:
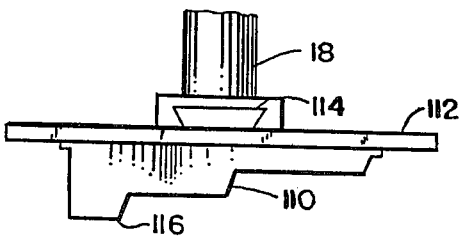
FIG. 10 is an elevation view of an electric discharge machining electrode produced in accordance with the method of the invention secured to the ram of an electrical discharge machine.

In addition, since the carbon block 110 is secured to an electrode mounting member 112 having a dovetail locating portion 114 secured thereto and since the tool 110 is provided with similar dovetail locating structure 38, the electrodes produced with the tool 110 in the manner indicated will be exactly interchangeable so that no time will be lost in setting up the electrode 116 produced as indicated above directly on the ram 18 of the electrical discharge machine 12 to perform a continuing electrical discharge machining operation as set forth above and as illustrated in FIG. 10.

Further, as will be unerstood by those in the machine tool art, electrical discharge machining electrodes may be formed in accordance with the method of the invention having the exact dimensions of a model electrode member by the method of first producing a master die member as set forth above by electrical discharge machining including the steps of mounting a model electrode member having the dimensions of an electrode to be formed in parallel relation to a die workpiece member and electrical discharge machining the die workpiece member with the model electrode member to form a cavity in the die workpiece member while moving the model electrode member toward the die workpiece member and at the same time applying an oscillatory rotary motion to one of the model electrode member and die workpiece member, as for example, by means of the tool 10 disclosed above, with a predetermined rotary motion amplitude as set by the eccentricity of the cylinders 60 and 86 of the tool 10. The master die member so formed will have an abrasive surface due to the inherent surface formed by the electrical discharge machining operation.

The electrode members may then be formed with the master die member by mounting an electrode workpiece such as a carborundum block in alignment with the master die member, with the master die member secured to the tool 10 and moving the electrode workpiece and master die member toward and into contact with one another while applying rotary oscillatory motion to one of the electrode workpiece and master die member having an amplitude which is the same as the amplitude used in the production of the master die member. In such operation with, for example, a male model electrode member, a female master die member which is oversize relative to the model electrode member is formed so that in later forming the electrode workpiece with the female master die member, the electrodes formed will be undersize with respect to the master die member the same amount that the master die member was oversize with respect to the model electrode member and the electrode produced from the electrode workpiece will be identical in size to the model electrode member.

Still further and of more importance, when the electrode produced from the electrode workpiece is to be used for electrical discharge machining, it will be necessary to change the amplitude of oscillation of the mater die member after a part to be produced is initially used as a model electrode to form the master die member so that the electrode formed by the master die member, in the case of, for example, a male part used as a model electrode member, will be undersize with respect to the model electrode member by an amount equal to the overcut to be expected in the electrical discharge machining operation using the electrode formed by the master die member. Thus, when the abrasion machined electrode formed from the electrode workpiece is to be used to form parts which are the same size as a part used as a model electrode member in the machining of the master die member having the abrasive surface, the electrode formed from the electrode workpiece must be of a different size than the model electrode member by the amount of the overcut which will be produced in the electrical discharge machining operation or the parts produced with the electrode formed from the electrode workpiece will not be the same size as the part used as the model electrode member.

While one embodiment of the present invention and modifications thereof have been considered in detail, it will be understood that other embodiments and modifications are contemplated by the inventor. It is the intention to include all embodiments and modifications as are defined by the appended claims within the scope of the invention.

What I claim as my invention is:

1. Structure for mechanically producing a desired form in a workpiece of friable material such as carbon or the like comprising a cutting master having a mirror image surface thereon of the form to be produced in the workpiece which is different in size from the form to be produced which surface is abrasive, means for supporting the cutting master, means for supporting the workpiece adjacent to the cutting master and in alignment with the abrasive mirror image surface thereon, means for moving the aligned cutting master and the workpiece with respect to each other toward and into contact with each other under pressure sufficient to cause abrasion of the workpiece by the abrasive mirror image surface on the cutting master on additional relative movement between the cutting master and the workpiece at least part of which additional movement is in a plane which does not include the direction of movement of the cutting master toward the workpiece, means included in at least one of the means for supporting the cutting master and workpiece for imparting an additional repetitive relative movement between the cutting master and workpiece for abrading the workpiece into the different size form to be produced in conjunction with the movement of the cutting master and workpiece toward each other, at least part of which additional relative movement is in a plane which does not include the direction of movement of the abrasive mirror image surface of the cutting master toward the workpiece, including at least one pair of relatively eccentric cylindrical members secured together axially for rotation together, first relatively movable plate means for receiving one of the pair of cylindrical members for orbital movement of the first plate means on rotation of the eccentric cylindrical members, second relatively stationary plate means for supporting the other of the pair of cylindrical members for rotation about the axis of the other of the pair of cylindrical members whereby the first plate means is moved in an orbital motion about the axis of the other of the pair of cylindrical members, in which structure the cutting master mirror image surface is different in size from the form to be produced by an amount related only to the additional relative movement imparted between the cutting master and workpiece in the plane not including the direction of movement of the cutting master toward the workpiece, and means for flushing a solvent fluid through the cutting master between the cutting master and workpiece while the workpiece is abraded into the form to be produced in the absence of electrical machining between the cutting master and workpiece.

2. Structure as set forth in claim 1 wherein the additional relative movement between the cutting master and workpiece is a rotary oscillatory movement in all directions in a plane perpendicular to the direction of movement of the cutting master and workpiece toward each other.

\* \* \* \* \*